US012680005B2

(12) United States Patent
Yokouchi et al.

(10) Patent No.: US 12,680,005 B2
(45) Date of Patent: Jul. 14, 2026

(54) CO-MODIFIED ORGANOPOLYSILOXANE AND CURABLE ORGANOPOLYSILOXANE COMPOSITION INCLUDING SAME

(71) Applicant: DOW TORAY CO., LTD., Tokyo (JP)

(72) Inventors: Yuki Yokouchi, Ichihara (JP); Tomohiro Iimura, Ichihara (JP); Tadashi Okawa, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 130 days.

(21) Appl. No.: 18/279,058

(22) PCT Filed: Feb. 28, 2022

(86) PCT No.: PCT/JP2022/008291

§ 371 (c)(1),
(2) Date: Dec. 11, 2023

(87) PCT Pub. No.: WO2022/186138

PCT Pub. Date: Sep. 9, 2022

(65) Prior Publication Data

US 2024/0158673 A1 May 16, 2024

(30) Foreign Application Priority Data

Mar. 5, 2021 (JP) ................................ 2021-034959

(51) Int. Cl.

| | |
|---|---|
| ***C09J 7/38*** | (2018.01) |
| ***C08G 77/08*** | (2006.01) |
| ***C08G 77/12*** | (2006.01) |
| ***C08G 77/20*** | (2006.01) |
| ***C08G 77/38*** | (2006.01) |
| ***C09J 5/06*** | (2006.01) |
| *C08G 77/00* | (2006.01) |

(52) U.S. Cl.

CPC ................ *C09J 7/38* (2018.01); *C08G 77/08* (2013.01); *C08G 77/12* (2013.01); *C08G 77/20* (2013.01); *C08G 77/38* (2013.01); *C09J 5/06* (2013.01); *C08G 77/70* (2013.01); *C09J 2301/302* (2020.08); *C09J 2301/414* (2020.08); *C09J 2301/416* (2020.08); *C09J 2483/00* (2013.01)

(58) Field of Classification Search

CPC ................................ C09J 7/38; H01L 23/296
See application file for complete search history.

(56) References Cited

U.S. PATENT DOCUMENTS

| | | | |
|---|---|---|---|
| 5,767,206 | A | 6/1998 | Ariagno et al. |
| 5,982,041 | A | 11/1999 | Mitani et al. |
| 6,288,129 | B1 | 9/2001 | Gruning et al. |
| 2011/0177342 | A1 | 7/2011 | Itoh et al. |
| 2011/0287267 | A1 | 11/2011 | Hori et al. |
| 2012/0165489 | A1 | 6/2012 | Takahashi |
| 2015/0240092 | A1 | 8/2015 | Wang |
| 2017/0323698 | A1 | 11/2017 | Hatakeyama et al. |
| 2017/0335076 | A1 | 11/2017 | Hatakeyama et al. |
| 2020/0038312 | A1 | 2/2020 | Furukawa et al. |
| 2021/0067128 | A1 | 3/2021 | Noguchi |
| 2021/0067724 | A1 | 3/2021 | Iwata et al. |
| 2021/0155831 | A1 | 5/2021 | Jang et al. |
| 2022/0002546 | A1 | 1/2022 | Jang et al. |
| 2022/0056317 | A1 | 2/2022 | Mecca et al. |
| 2022/0228038 | A1 | 7/2022 | Tanaka et al. |
| 2024/0150526 | A1 | 5/2024 | Yokouchi et al. |
| 2024/0158673 | A1 | 5/2024 | Yokouchi et al. |
| 2024/0254367 | A1 | 8/2024 | Kikunga et al. |

FOREIGN PATENT DOCUMENTS

| | | | |
|---|---|---|---|
| CN | 107955579 | A | 4/2018 |
| FR | 2729406 | A1 | 7/1996 |
| JP | H05132557 | A | 5/1993 |
| JP | H07145323 | A | 6/1995 |
| JP | H09286971 | A | 11/1997 |
| JP | 2003192790 | A | 7/2003 |
| JP | 2005015748 | A | 1/2005 |
| JP | 2006083299 | A | 3/2006 |
| JP | 2006083300 | A | 3/2006 |
| JP | 2009114285 | A | 5/2009 |
| JP | 2010036577 | A | 2/2010 |
| JP | 2010150537 | A | 7/2010 |
| JP | 2012012544 | A | 1/2012 |
| JP | 2012012545 | A | 1/2012 |
| JP | 2012136678 | A | 7/2012 |
| JP | 2013166877 | A | 8/2013 |
| JP | 2013203794 | A | 10/2013 |
| JP | 2015531806 | A | 11/2015 |
| JP | 2016183291 | A | 10/2016 |

(Continued)

OTHER PUBLICATIONS

English translation of International Search Report for PCT/JP2022/008290 dated Apr. 26, 2022, 3 pages.

(Continued)

*Primary Examiner* — Dah-Wei D. Yuan
*Assistant Examiner* — Andrew J Bowman
(74) *Attorney, Agent, or Firm* — Warner Norcross + Judd LLP

(57) ABSTRACT

Provided is an organopolysiloxane compound serving as a raw material of an organopolysiloxane pressure-sensitive adhesive which has necessary and sufficient pressure-sensitive adhesive strength in a step such as temporary fixing or the like and can be easily peeled off from a substrate in a subsequent step; an organopolysiloxane pressure-sensitive adhesive composition containing the same; and a method for using the same. A chain co-modified organopolysiloxane containing a silicon-bonded functional group ($R^A$) that contains a specific (meth)acrylic group and at least one aliphatic unsaturated carbon-carbon bond ($R^{Vi}$) (but excluding the functional group serving as $R^A$ above); a curable organopolysiloxane composition containing the same, further containing a crosslinking agent, a hydrosilylation reaction catalyst, and a photo-radical polymerization initiator, and having both heat curability and photo-curability.

19 Claims, No Drawings

(56) References Cited

FOREIGN PATENT DOCUMENTS

| | | | | | |
|---|---|---|---|---|---|
| JP | 2017202023 | A | | 11/2017 | |
| JP | 2017206626 | A | | 11/2017 | |
| JP | 2020186284 | A | | 11/2020 | |
| JP | 2021501813 | A | | 1/2021 | |
| JP | 2021034958 | A | | 3/2021 | |
| JP | 2021034959 | A | | 3/2021 | |
| JP | 2022501460 | A | | 1/2022 | |
| JP | 2022524781 | A | | 5/2022 | |
| WO | 2009060964 | A1 | | 5/2009 | |
| WO | 2018066572 | A1 | | 4/2018 | |
| WO | WO-2019084397 | A1 | * | 5/2019 | ............ C08G 77/08 |
| WO | 2020230723 | A1 | | 11/2020 | |
| WO | 2022186137 | A1 | | 9/2022 | |
| WO | 2022186138 | A1 | | 9/2022 | |
| WO | 2022234802 | A1 | | 11/2022 | |

OTHER PUBLICATIONS

English translation of International Search Report for PCT/JP2022/008291 dated Apr. 19, 2022, 2 pages.

Machine assisted English translation of JPH05132557A obtained from https://worldwide.espacenet.com/patent on Aug. 24, 2023, 15 pages.

Machine assisted English translation of JP2005015748A obtained from https://worldwide.espacenet.com/patent on Aug. 24, 2023, 6 pages.

Machine assisted English translation of JPH07145323A obtained from https://worldwide.espacenet.com/patent on Aug. 24, 2023, 11 pages.

Machine assisted English translation of JP2003192790A obtained from https://worldwide.espacenet.com/patent on Aug. 24, 2023, 8 pages.

Machine assisted English translation of CN107955579A obtained from https://worldwide.espacenet.com/patent on Aug. 24, 2023, 11 pages.

Machine assisted English translation of JP2012012544A obtained from https://worldwide.espacenet.com/patent on Aug. 24, 2023, 9 pages.

Machine assisted English translation of JP2013166877A obtained from https://worldwide.espacenet.com/patent on Aug. 24, 2023, 18 pages.

Machine assisted English translation of JP2013203794A obtained from https://worldwide.espacenet.com/patent on Aug. 24, 2023, 13 pages.

Machine assisted English translation of JP2006083300A obtained from https://worldwide.espacenet.com/patent on Aug. 24, 2023, 12 pages.

Machine assisted English translation of JP2006083299A obtained from https://worldwide.espacenet.com/patent on Aug. 24, 2023, 12 pages.

Machine assisted English translation of JP2016183291A obtained from https://worldwide.espacenet.com/patent on Aug. 24, 2023, 25 pages.

Machine assisted English translation of JP2012012545A obtained from https://worldwide.espacenet.com/patent on Aug. 24, 2023, 17 pages.

English translation of International Search Report for PCT/JP2022/046170 dated Feb. 7, 2023, 2 pages.

* cited by examiner

CO-MODIFIED ORGANOPOLYSILOXANE AND CURABLE ORGANOPOLYSILOXANE COMPOSITION INCLUDING SAME

CROSS-REFERENCE TO RELATED APPLICATIONS

This application is the U.S. National Stage of PCT/JP2022/008291 filed on 28 Feb. 2022 and claims priority to Japanese Patent Application No. 2021-034959 filed on 5 Mar. 2021, the content of which is incorporated herein by reference.

TECHNICAL FIELD

The present invention relates to a chain co-modified organopolysiloxane having both a (meth)acrylic functional group and another aliphatic unsaturated carbon-carbon bond-containing group (alkenyl group or the like) in a molecule and having both heat curability and photo-curability, a curable organopolysiloxane composition containing the same, an organopolysiloxane pressure-sensitive adhesive composition, and a method for using an organopolysiloxane pressure-sensitive adhesive composition in which a photo-curing reaction is performed after a heat curing reaction to reduce the pressure-sensitive adhesive strength of a pressure-sensitive adhesive to a substrate before and after the photo-curing reaction. Note that in the present invention, the pressure-sensitive adhesive includes a so-called pressure-sensitive adhesive (=PSA).

BACKGROUND ART

Organopolysiloxane pressure-sensitive adhesive compositions are superior to acrylic and rubber pressure-sensitive adhesive compositions in electrical insulation, heat resistance, cold resistance, pressure-sensitive adhesion to various adherends, and transparency, if necessary, and thus are widely used in the manufacture of semiconductor wafers, electronic and electrical devices such as smartphones, tablet PCs and the like, and display devices such as displays and the like. In particular, in recent years, since a member or a protective film is temporarily fixed with a relatively weak adhesive force and the temporarily fixed member or the like is peeled off from an adhesive according to the progress of a step in processing of a semiconductor wafer or an assembling step of electronic and electrical devices or a display, a composition forming a pressure-sensitive adhesive with slight pressure-sensitive adhesion as compared with a conventional organopolysiloxane pressure-sensitive adhesive composition is required.

In particular, in recent years, in semiconductor wafer processing and the like, a pressure-sensitive adhesive sheet obtained by applying a pressure-sensitive adhesive onto a substrate made of a film has been used in a dicing/pickup/mounting step after a step of grinding a back surface of a semiconductor wafer. In these steps, there is a case where pressure-sensitive adhesive strength is required and a case where easy releasability is required. In other words, of these steps, the step of grinding the back surface of the semiconductor wafer requires that the pressure-sensitive adhesive sheet be sufficiently adhered to the semiconductor wafer without being peeled off in order to protect the pattern surface of the semiconductor wafer. In addition, easy peeling must be possible from the semiconductor wafer after grinding. Similarly, in the dicing step of the semiconductor wafer, high pressure-sensitive adhesion is required such that cut and separated element pieces do not peel off from the pressure-sensitive adhesive sheet. On the other hand, in the pickup step, the cut and separated small element pieces must be easily peeled off from the pressure-sensitive adhesive sheet. In other words, the pressure-sensitive adhesive sheet is required to have pressure-sensitive adhesion.

However, there is a trade-off relationship between the pressure-sensitive adhesive strength for the purpose of fixing or protection and the ease of peeling of a member, and when a pressure-sensitive adhesive with slight pressure-sensitive adhesion is used, the pressure-sensitive adhesive strength is insufficient in a step in which the pressure-sensitive adhesive strength is required for temporary fixing or the like, which may cause process failure. On the other hand, when the pressure-sensitive adhesive strength is high, peeling in a post-process may become difficult, or a problem of process failure due to adhesive residue caused by breakage of the aggregated layer may occur. Therefore, there is a demand for a pressure-sensitive adhesive which has a necessary and sufficient pressure-sensitive adhesive strength in a step such as temporary fixing or the like and can be very easily peeled off from a substrate in a subsequent step.

On the other hand, active energy beam-curable and re-releasable pressure-sensitive adhesives have been proposed in the fields of film materials, electrode materials, and the like (e.g., Patent Documents 1 to 3). By using an acrylic copolymer or polyurethane copolymer, these pressure-sensitive adhesives can significantly change their adhesive properties before and after active energy beam irradiation, can develop high pressure-sensitive adhesion before active energy beam irradiation, and can develop high releasability after active energy beam irradiation. However, the pressure-sensitive adhesives described in these documents have an organic molecular skeleton. Therefore, there is still room for improvement in applications intended to protect substrates during processing, particularly in terms of heat resistance and durability.

Furthermore, the documents above neither describe nor suggest: the use of an organopolysiloxane compound having a chain (straight chain or branched chain) molecular structure which has a (meth)acrylic functional group and another aliphatic unsaturated carbon-carbon bond-containing group at a certain ratio and that provides coatable viscosity as a raw material for a pressure-sensitive adhesive, and a co-modified organopolysiloxane compound having such a plurality of curing-reactive functional groups, in a curing reaction mechanism including a hydrosilylation reaction; a pressure-sensitive adhesive composition containing these; and characteristics (particularly two-stage curability and change in pressure-sensitive adhesive strength) related to curing thereof.

On the other hand, Patent Document 4 proposes: an organopolysiloxane composition containing an organopolysiloxane compound containing a (meth)acrylic functional group-containing group, a platinum-based catalyst and a photoinitiator, the composition being capable of a curing reaction by a photo-polymerization reaction and addition reaction, and having excellent heat resistance, discoloration resistance and low tack properties; and a sealing agent containing a cured product thereof. However, the document does not specifically disclose a co-modified organopolysiloxane containing a (meth)acrylic functional group-containing group, an alkenyl group, and the like, and particularly does not describe or suggest anything about a pressure-sensitive adhesive composition containing a co-modified organopolysiloxane containing both groups at a specific ratio as well as characteristics related to curing thereof (particularly two-stage curability and change in pressure-sensitive adhesive strength).

RELATED ART DOCUMENTS

Patent Documents

[Patent Document 1] Japanese Unexamined Patent Application 2012-012545
[Patent Document 2] Japanese Unexamined Patent Application 2012-136678
[Patent Document 3] Japanese Unexamined Patent Application 2013-166877
[Patent Document 4] Japanese Unexamined Patent Application 2013-203794

SUMMARY OF THE INVENTION

Problem to be Solved by the Invention

The present invention has been made to solve the aforementioned problems, and an object of the present invention is to provide an organopolysiloxane compound that serves as a raw material for an organopolysiloxane pressure-sensitive adhesive which has a necessary and sufficient pressure-sensitive adhesive strength in a step such as temporary fixing or the like and can be very easily peeled off from a substrate in a subsequent step. Another object of the present invention is to provide: a curable organopolysiloxane composition containing the organopolysiloxane compound; an organopolysiloxane pressure-sensitive adhesive composition containing the same; and a method of using the organopolysiloxane pressure-sensitive adhesive composition.

Means for Solving the Problem

As a result of conducting diligent research on the problem described above, the present inventors arrived at the present invention. In other words, the object of the present invention can be achieved by a chain co-modified organopolysiloxane containing a specific silicon-bonded functional group containing an acrylic group or a methacrylic group and a silicon-bonded functional group containing at least one aliphatic unsaturated carbon-carbon bond such as an alkenyl group or the like in a molecule. In addition, the object of the present invention can be achieved by a curable organopolysiloxane composition and an organopolysiloxane pressure-sensitive adhesive composition containing the co-modified organopolysiloxane.

The co-modified organopolysiloxane according to the present invention has both heat curability and photo-curability. Therefore, when a pressure-sensitive adhesive layer, which is a semi-cured product containing the co-modified organopolysiloxane, is formed by a heat curing reaction and then is completely cured by a photo-curing reaction, the pressure-sensitive adhesive strength of the pressure-sensitive adhesive layer to a substrate is significantly reduced before and after the photo-curing reaction. As a result, the pressure-sensitive adhesive layer according to the present invention has a necessary and sufficient pressure-sensitive adhesive strength after heat curing, and is then irradiated with a high energy beam to be photo-cured, whereby the pressure-sensitive adhesive strength is reduced and easy releasability can be realized.

Effect of the Invention

The present invention can provide: an organopolysiloxane compound which is a chain co-modified organopolysiloxane having both heat curability and photo-curability and which is a raw material for an organopolysiloxane pressure-sensitive adhesive in which a semi-cured product after heat curing has necessary and sufficient pressure-sensitive adhesive strength and a cured product after photo-curing reaction can be very easily peeled from a substrate. Furthermore, the present invention can provide a curable organopolysiloxane composition containing the organopolysiloxane compound, and particularly can provide: an organopolysiloxane pressure-sensitive adhesive composition in which the pressure-sensitive adhesive strength of a pressure-sensitive adhesive layer to a substrate is significantly reduced before and after a photo-curing reaction and which can realize easy releasability; and a method for using the same.

In particular, the curable organopolysiloxane composition containing the co-modified organopolysiloxane according to the present invention has a coatable viscosity, is excellent in curability, and can provide a cured product (particularly, a cured product film) having favorable adhesion to a substrate and excellent transparency by a curing reaction. Furthermore, the present invention can realize a silicone-based pressure-sensitive adhesive layer/adhesion layer whose pressure-sensitive adhesive strength changes before and after a photo-curing reaction, and can provide: a use as a protective member in a wide range of applications; and a manufacturing method and a protection method including an apparatus or a device provided with the same.

DESCRIPTION OF THE PREFERRED EMBODIMENTS

[(A) Co-Modified Organopolysiloxane]

The co-modified organopolysiloxane according to the present invention is a chain polysiloxane molecule and may be a straight chain or may have a branched chain structure having a branch on a portion. Such a co-modified organopolysiloxane may have a siloxane unit (M unit) expressed by $R_3SiO_{1/2}$ at a molecular chain end, a main chain essentially configured of a siloxane unit (D unit) expressed by $R_2SiO_{2/2}$, and a siloxane unit (T unit) expressed by $RSiO_{3/2}$ and/or a siloxane unit (Q unit) expressed by $SiO_{4/2}$ providing a branched structure to a portion of the main chain, and may have, within a scope that does not impair the technical effect of the present invention, a divalent linking group such as a silalkylene bond or the like on a portion between siloxane units. R above each independently represents a monovalent organic group, and of all the Rs, at least one is a silicon-bonded functional group ($R^A$) containing an acrylic group or a methacrylic group described later, and at least one is a silicon-bonded functional group ($R^{Vi}$) containing at least one aliphatic unsaturated carbon-carbon bond (but excluding the functional group serving as $R^A$ above). Note that from the perspective of crosslinking reactivity, at least two of R in all the siloxane units configuring the co-modified organopolysiloxane are preferably silicon-bonded functional groups ($R^{OH}$).

Preferably, the co-modified organopolysiloxane according to the present invention has a straight chain or branched chain polysiloxane structure in which 90 mol % or more of all siloxane units, excluding the ends of the molecular chain, are D units, preferably 95 to 100 mol % are D units, and a straight chain co-modified organopolysiloxane is particularly preferable. Note that the straight chain polysiloxane structure is configured only of the M units at both ends and the D units configuring the main chain.

The degree of siloxane polymerization of the co-modified organopolysiloxane according to the present invention is not particularly limited, but is preferably in a range of 10 to 10,000, and more preferably in a range of 25 to 2,000, from the perspective of imparting a coatable viscosity to the curable organopolysiloxane composition containing the co-modified organopolysiloxane. When a resinous organopolysiloxane containing a large amount of the T units and Q units and an organopolysiloxane having a high degree of polymerization are used, coating of the curable composition may become difficult.

Such a co-modified organopolysiloxane is expressed by the above siloxane units by the following formula.

Formula: $M_{(2+m+2p)}D_nT_mQ_p$

In the formula, n is a positive number, n and m are 0 or positive numbers, "2+m+2p+n+m+p", which is the total number of siloxane units (in other words, the degree of siloxane polymerization), is a number in the range of 10 to 10,000, and at least 90 mol % of all the siloxane units excluding the end M units are D units. Note that in the case of a straight chain polysiloxane structure, the co-modified organopolysiloxane according to the present invention is expressed by $MD_nM$, and n+2 is a number in the range of 10 to 10,000.

The co-modified organopolysiloxane according to the present invention contains in a molecule thereof: a silicon-bonded functional group ($R^A$) containing an acrylic group or methacrylic group; and a silicon-bonded functional group ($R^{Vi}$) containing at least one aliphatic unsaturated carbon-carbon bond (but excluding the functional group serving as $R^A$ above). Herein, the silicon-bonded functional group ($R^A$) is a functional group exhibiting photo-curability by irradiation with a high energy beam in the presence of a photo-radical polymerization initiator, and the silicon-bonded functional group ($R^{Vi}$) is a functional group exhibiting heat curability in the presence of a hydrosilylation reaction catalyst. The co-modified organopolysiloxane according to the present invention has both heat-curable and photo-curable silicon-bonded functional groups in the same molecule. Therefore, a pressure-sensitive adhesive layer formed from a semi-cured product after a heat curing reaction has a high initial adhesive force, and when the semi-cured product is irradiated with a high energy beam, the pressure-sensitive adhesive strength is greatly reduced, and easy releasability can be realized.

In order to achieve the property where the pressure-sensitive adhesive changes to become an easily releasable cured material by irradiation with a high energy beam, the co-modified organopolysiloxane according to the present invention may contain a silicon-bonded functional group containing an acrylic group or a methacrylic group ($R^A$) in a range of 0.10 to 10.0 mol %, preferably in a range of 0.20 to 5.0 mol %, and more preferably in a range of 0.30 to 5.0 mol % with respect to all functional groups bonded to silicon atoms configuring the polysiloxane (all Rs in each siloxane unit described above). Furthermore, from the perspective of providing a semi-cured product with excellent initial adhesive force by a heat curing reaction, in a molecule, the silicon-bonded functional group ($R^A$) containing an acrylic group or methacrylic group per mol of the silicon-bonded functional group ($R^{Vi}$) containing at least one aliphatic unsaturated carbon-carbon bond (but excluding the functional group serving as $R^A$ above) is included in a range at which the average amount thereof is 2.0 to 50.0 mols, and preferably in a range of 2.0 to 10.0 mols. When the amount of the photo-curable silicon-bonded functional group ($R^A$) is less than the lower limit, the photo-curing reaction does not sufficiently proceed, and the pressure-sensitive adhesive properties may not change to create an easily releasable cured product. When the amount exceeds the upper limit, problems such as side reactions and coloring may occur. When the amount of the heat-curable (hydrosilylation-reactive) silicon-bonded functional group ($R^{Vi}$) is less than the lower limit, the sufficient initial adhesive properties may not be realized. On the other hand, when the amount exceeds the upper limit, excess carbon-carbon double bond moieties such as vinyl group moieties and the like may result in no change in pressure-sensitive adhesive properties to an easily releasable cured product, or curing may be strong and excessive such that pressure-sensitive adhesion cannot be achieved. Note that from the perspective of crosslinking reactivity, at least two of all the functional groups bonded to silicon atoms configuring the polysiloxane (all Rs in each siloxane unit described above) are preferably silicon-bonded functional groups ($R^{Vi}$).

Herein, the silicon-bonded functional group ($R^A$) containing an acrylic group or methacrylic group is expressed by the following.

General Formula (1):

[Chem. FIG. 1]

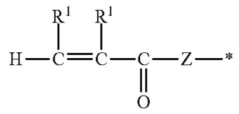

In the formula, $R^1$ mutually independently represents a hydrogen atom, a methyl group, or a phenyl group, and preferably a hydrogen atom or a methyl group in order to form an acrylic group or a methacrylic group moiety. Z represents a divalent organic group which may contain a hetero atom and is bonded to a silicon atom configuring the main chain of the polysiloxane represented by *, and may be a divalent organic group which may contain an oxygen atom, a nitrogen atom or a sulfur atom.

Specifically, Z preferably represents a group selected from: alkylene groups having 2 to 22 carbon atoms; divalent organic groups expressed by $-R^3-C(=O)-O-R^4-$ {where $R^3$ represents an alkylene group having 2 to 22 carbon atoms, and $R^4$ represents a group selected from ethylene groups, propylene groups, methylethylene groups and hexylene groups}; and divalent organic groups expressed by $-Z^1-X-C(=O)-X-Z^2-$ {where $Z^1$ represents $-O(CH_2)_k-$ (where k is a number in a range of 0 to 3), and X represents an oxygen atom, a nitrogen atom, or a sulfur atom. $Z^2$ represents a divalent organic group expressed by $-[(CH_2]_2O]_m(CH_2)_n-$ (where m is a number in a range of 0 to 3, and n is a number in a range of 3 to 10) bonded to a silicon atom configuring the main chain of the polysiloxane represented by *}.

Particularly preferably, the silicon-bonded functional group ($R^A$) is expressed by general formula (1-1):

[Chem. FIG. 2]

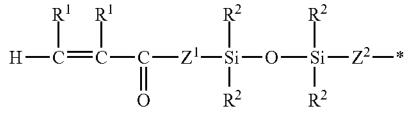

In the formula, $R^1$ mutually independently represents a hydrogen atom, a methyl group, or a phenyl group, and preferably a hydrogen atom or a methyl group. $R^2$ mutually independently represents an alkyl group or an aryl group, preferably an alkyl group or a phenyl group having 1 to 20 carbon atoms for industrial purposes, and particularly preferably a methyl group. $Z^1$ represents —$O(CH^2)^m$— (m is a number in the range 0 to 3), where m is preferably 1 or 2. $Z^2$ represents a divalent organic group expressed by —$(CH_2)_n$— (n is a number in a range of 3 to 10) bonded to a silicon atom configuring the main chain of the polysiloxane represented by *, and a case where n is 2 to 6 is preferred for practical use. Note that the silicon-bonded functional group ($R^A$) expressed by general formula (1-1) can be introduced into a molecule by reacting a silicon-bonded functional group containing at least one alkenyl group ($R^{Vi}$) and a hydrosilane compound having a silicon-bonded hydrogen atom and (meth)acrylic functional group in a molecule (e.g., 3-(1,1,3,3-tetramethyldisiloxanyl)propyl methacrylate and the like), in the presence of a hydrosilylation reaction catalyst. Furthermore, the same reaction may be and preferably is performed in the presence of a polymerization inhibitor such as dibutylhydroxytoluene (BHT).

The silicon-bonded functional group ($R^{Vi}$) containing at least one aliphatic unsaturated carbon-carbon bond is an organic group containing one or more addition-reaction capable aliphatic unsaturated carbon-carbon bond expressed by an aliphatic carbon-carbon double bond (C═C), and is a component that imparts hydrosilylation reactivity and heat curability to the co-modified organopolysiloxane according to the present invention. However, the range of the silicon-bonded functional group ($R^{Vi}$) does not include the silicon-bonded functional group ($R^A$) containing an acrylic group or methacrylic group described above, and $R^{Vi}$ and $R^A$ are different functional groups. In particular, from the perspective of crosslinking reactivity, the co-modified organopolysiloxane according to the present invention preferably contains at least two silicon-bonded functional groups ($R^{Vi}$) in a molecule.

The silicon-bonded functional group ($R^{Vi}$) is preferably an alkenyl group having 2 to 20 carbon atoms, with examples including vinyl groups, allyl groups, butyl groups, hexenyl groups, and the like. A hexenyl group (C6) is particularly preferable from the perspective of crosslinking reactivity.

In the co-modified organopolysiloxane according to the present invention, the aforementioned silicon-bonded functional group ($R^A$) and silicon-bonded functional group ($R^{Vi}$) may be bonded to a silicon atom at the molecular chain end of a chain siloxane, or may be a side-chain modifying group bonded to a silicon atom on a polysiloxane main chain. In addition, the co-modified organopolysiloxane according to the present invention may be a single organopolysiloxane or a mixture of two or more types of co-modified organopolysiloxanes having different degrees of siloxane polymerization, different modification ratios by $R^A$ and $R^{Vi}$, different main chain structures, or different end structures.

In the co-modified organopolysiloxane according to the present invention, organic groups other than the aforementioned silicon-bonded functional group ($R^A$) and silicon-bonded functional group ($R^{Vi}$) (hereinafter, referred to as "another organic group") may contain: a methyl group, an ethyl group, a propyl group, a butyl group, a pentyl group, a hexyl group, a heptyl group, or another alkyl group; a phenyl group, a tolyl group, a xylyl group, a naphthyl group, or another aryl group; a benzyl group, a phenethyl group, or another aralkyl group; a chloromethyl group, a 3-chloropropyl group, a 3,3,3-trifluoropropyl group, or other halogenated alkyl group; or the like. From an industrial perspective, it is particularly preferable to include a methyl group.

[(A) Use of Co-Modified Organopolysiloxane]

The co-modified organopolysiloxane according to the present invention has both heat curability by a hydrosilylation reaction and photo-curability by irradiation with a high energy beam, and thus is suitable as a raw material for a curable organopolysiloxane composition, which is cured via a plurality of curing mechanisms or two or more curing steps. In addition, the co-modified organopolysiloxane according to the present invention is particularly useful as an organopolysiloxane pressure-sensitive adhesive composition or a raw material for a pressure-sensitive adhesive layer, which is characterized by a change in pressure-sensitive adhesive strength triggered by irradiation with high energy beam, because coatable viscosity is provided, a semi-cured product obtained by a heat curing reaction has excellent initial pressure-sensitive adhesive strength to a substrate, unreacted silicon-bonded functional groups ($R^A$) form an easily releasable cured layer by a photo-curing reaction by irradiation with a high energy beam, and the pressure-sensitive adhesive strength to the substrate is greatly reduced.

[Curable Organopolysiloxane Composition]

The curable organopolysiloxane composition according to the present invention contains the aforementioned (A) co-modified organopolysiloxane, and has both heat curability by a hydrosilylation reaction and photo-curability by irradiation with a high energy beam.

More specifically, the curable organopolysiloxane composition according to the present invention contains:

(A) the co-modified organopolysiloxane according to the present invention;

(B) an organohydrogenpolysiloxane having at least two silicon-bonded hydrogen atoms in a molecule;

(C) a hydrosilylation reaction catalyst; and (D) a photo-radical polymerization initiator, and may optionally further contain:

(E) an organopolysiloxane resin containing, in a molecule, a siloxane unit (M unit) expressed by $R_3SiO_{1/2}$ (where R mutually independently represents a monovalent organic group) and a siloxane unit (Q unit) expressed by $SiO_{4/2}$ in a range at which the ratio of M units to Q units is 0.5 to 2.0;

(F) a polydimethylsiloxane which may optionally have an alkenyl group; and (G) an organic solvent.

Descriptions of components (B) to (G) will be provided below.

[(B) Organohydrogenpolysiloxane]

Component (B) is an organohydrogenpolysiloxane having at least two or more silicon-bonded hydrogen atoms in a molecule, and is a component that functions as a crosslinking agent in the curable organopolysiloxane composition described above. Specifically, the silicon-bonded functional group ($R^{Vi}$) containing at least one aliphatic unsaturated carbon-carbon bond in component (A) can react in the presence of (C) a hydrosilylation reaction catalyst to form a pressure-sensitive adhesive layer, which is a semi-cured product. The pressure-sensitive adhesive layer has excellent initial pressure-sensitive adhesive strength to the substrate, but includes unreacted photo-curable silicon-bonded functional groups ($R^A$), so the pressure-sensitive adhesive strength is greatly reduced by two-step curing triggered by high energy beam irradiation, and thus easy releaseability is exhibited.

Component (B) may be at least one type selected from cyclic organohydrogen polysiloxanes having at least three silicon-bonded hydrogen atoms in the molecule, and straight chain or branched chain organohydrogenpolysiloxanes having at least two or more silicon-bonded hydrogen atoms in the molecule. Component (B) may be a mixture of two or more of the aforementioned organohydrogenpolysiloxanes.

Examples of cyclic organohydrogenpolysiloxanes include those expressed by the following formulas:

$$[(R^3HSiO)_{m3}(R^3{}_2SiO)_{m4}]$$

In the formula, the value of m3+m4 is within a range of 3 to 20, m3 is a value of 3 or higher, and m4 is a value of 0 or higher. $R^3$ represents a monovalent hydrocarbon group having 1 to 10 carbon atoms, excluding alkenyl groups, and examples include the same groups as $R^2$, preferably methyl or phenyl groups.

The straight chain or branched chain organohydrogen polysiloxane having at least two or more silicon-bonded hydrogen atoms in the molecule is an organohydrogen polysiloxane such as a polyorganohydrogen siloxane or a copolymer of organohydrogenpolysiloxane and diorganosiloxane, having at least two or more silicon-bonded hydrogen atoms in a side chain moiety and having the terminals of the molecular chain blocked with a trialkylsiloxy group, aryl dialkylsiloxy group, and the like. The degree of siloxane polymerization ranges from 5 to 500, preferably from 5 to 200.

Specific examples of component (B) include 1,3,5,7-tetramethyl cyclotetrasiloxane, tris(dimethylhydrogensiloxy) methylsilane, tris(dimethylhydrogensiloxy) phenylsilane, 1-(3-glycidoxypropyl)-1,3,5,7-tetramethyl cyclotetrasiloxane, 1,5-di(3-glycidoxypropyl)-1,3,5,7-tetramethyl cyclotetrasiloxane, 1-(3-glycidoxypropyl)-5-trimethoxysilylethyl-1,3,5,7-tetramethyl cyclotetrasiloxane, methylhydrogenpolysiloxanes blocked at both ends of a molecular chain with trimethylsiloxy groups, dimethylsiloxane-methylhydrogensiloxane copolymers blocked at both ends of a molecular chain with trimethylsiloxy groups, dimethylpolysiloxane blocked at both ends of a molecular chain with dimethylhydrogensiloxy groups, methylhydrogensiloxane-diphenylsiloxane copolymers blocked at both ends of a molecular chain with trimethylsiloxy groups, methylhydrogensiloxane-diphenylsiloxane-dimethylsiloxane copolymers blocked at both ends of a molecular chain with trimethylsiloxy groups, methyl tris(dimethylsiloxy) silane, tetrakis(dimethylsiloxysilane), methylhydrogenpolysiloxane blocked at both ends of a molecular chain with trimethylsiloxy groups, methylhydrogensiloxane-dimethylsiloxane copolymers blocked at both ends of a molecular chain with trimethylsiloxy groups, methylhydrogensiloxane-methylphenylsiloxane copolymers blocked at both ends of a molecular chain with trimethylsiloxy groups, and the like.

The amount of component (B) can be selected based on the desired pressure-sensitive adhesive strength and curing properties, but from the perspective of initial pressure-sensitive adhesive strength and easy releasability triggered by high energy beam irradiation which are the issues of the present invention, a range of 0.1 to 5 parts by mass in 100 parts by mass of the aforementioned component (A), co-modified organopolysiloxane, is preferred, 0.5 to 4.5 parts by mass is more preferable, and 1.0 to 3.5 parts by mass is especially preferable. If the amount of component (B) used is less than the lower limit described above, the crosslinking agent may be insufficient, resulting in insufficient heat curability of the composition, but if the amount exceeds the upper limit described above, the change in pressure-sensitive adhesive strength of the pressure-sensitive adhesive layer before and after irradiation with high energy beam becomes small, and thus the object of the present invention may not be achieved. In addition, with regard to the amount of component (B) used, the molar number of silicon-bonded hydrogen atoms in component (B) to the molar number of aliphatic unsaturated carbon-carbon bonds such as alkenyl groups and the like in the composition (hereinafter, "SiH/Vi ratio") is preferably in a range of 0.1 to 40, more preferably in a range of 0.5 to 30, and particularly preferably in a range of 1.0 to 30. Within this range, the overall crosslink density can be appropriately adjusted, and the desired properties for storage elastic modulus and close adhesion of the cured product can be achieved. On the other hand, if the SiH/Vi ratio is less than the lower limit, adhesive residue or the like may occur when the cured product is closely adhered to the substrate. If the ratio exceeds the upper limit, unreacted SiH groups may become excessive, resulting in unstable close adhesion properties of the cured product.

[(C) Hydrosilylation Reaction Catalyst]

Component (C) is a hydrosilylation reaction catalyst, and is a component that promotes the hydrosilylation reaction of component (B) with aliphatic unsaturated carbon-carbon bonds such as alkenyl groups and the like in component (A) and other optional components by heating or the like.

Examples of hydrosilylation reaction catalysts include platinum-based catalysts, rhodium-based catalysts, and palladium-based catalysts, with platinum-based catalysts being preferable in that they markedly accelerate the curing of the present composition. Examples of this platinum-based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of this alkenyl siloxane include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups of these alkenyl siloxanes are substituted with groups selected from a group consisting of nitriles, amides, dioxolanes, and sulfolanes, ethyl groups, phenyl groups, or the like, and alkenyl siloxanes in which the vinyl groups of these alkenyl siloxanes are substituted with allyl groups, hexenyl groups, or the like. In particular, 1,3-divinyl-1,1,3,3-tetramethyldisiloxane is preferably used because of the favorable stability of this platinum-alkenylsiloxane complex, and is preferably added in the form of an alkenylsiloxane solution. In addition, from the perspective of improving handling workability and pot life of the composition, these hydrosilylation reaction catalysts may be thermoplastic resin microparticles containing a hydrosilylation reaction catalyst, which are catalysts dispersed or encapsulated in a thermoplastic resin such as a silicone resin, a polycarbonate resin, an acrylic resin, or the like, and particularly may be a thermoplastic resin microparticles containing a hydrosilylation reaction catalyst that contains platinum. Note that as the catalyst for promoting the hydrosilylation reaction, a non-platinum-based metal catalyst such as iron, ruthenium, iron/cobalt, or the like may be used.

Note that the thermoplastic resin microparticles containing a platinum-containing hydrosilylation reaction catalyst that can be used in the present invention may be either microparticles in which a hydrosilylation reaction catalyst such as a platinum-based catalyst is dissolved or dispersed in a thermoplastic resin, or microparticles having a structure in which a hydrosilylation reaction catalyst such as a platinum-based catalyst is contained as a core in a thermoplastic resin shell. The thermoplastic resin used as the wall material preferably has a glass transition temperature (Tg) of 75° C.

or higher, more preferably 80° C. or higher, and particularly preferably in a range of 80 to less than 250° C. These thermoplastic resins may be used individually or as a combination of a plurality of resins. Furthermore, the average particle size of the thermoplastic resin microparticles containing the catalyst for hydrosilylation reactions is not limited, but is preferably in a range of 0.1 to 500 μm, and more preferably in a range of 0.3 to 100 μm.

While the amount of the hydrosilylation reaction catalyst is not particularly limited in the present invention, the amount of the platinum-based metal with regard to the total amount of solid fraction in the composition is within a range of 0.1 to 200 ppm, and may be within a range of 0.1 to 150 ppm, within a range of 0.1 to 100 ppm, or within a range of 0.1 to 50 ppm. Herein, the platinum-based metal is a metal element of group VIII including platinum, rhodium, palladium, ruthenium and iridium. However, in practical use, the amount of the platinum-metal excluding the ligands of the hydrosilylation reaction catalyst is preferably within the range described above. Note that the solid fraction is a component that forms the cured layer (primarily a main agent, an adhesion-imparting component, a crosslinking agent, a catalyst, and other non-volatile components) when the curable organopolysiloxane composition according to the present invention is subjected to a curing reaction and does not include volatile components such as solvents that volatilize at the time of heat curing.

When the amount of the platinum-based metal in the curable organopolysiloxane composition according to the present invention is 50 ppm or less (45 ppm or less, 35 ppm or less, 30 ppm or less, 25 ppm or less, or 20 ppm or less), discoloration or coloration of the transparent adhesion layer may be suppressable, in particular, after curing or when heated or exposed to a high energy beam such as UV rays. Meanwhile, from the perspective of the curability of the organopolysiloxane composition, the amount of the platinum-based metal is no lower than 0.1 ppm, because when the amount is lower than this lower limit, this may cause curing defects.

The curable organopolysiloxane composition of the present invention may optionally contain a curing retarder. A curing retarder is added to inhibit a crosslinking reaction between the aliphatic unsaturated carbon-carbon bond-containing groups and the silicon bonded hydrogen atoms in the composition, to extend usable time at ambient temperature, and to improve storage stability. Therefore, in practical use, the component is nearly essential to the curable organopolysiloxane composition of the present invention.

Specifically, examples of the curing retarder include acetylenic compounds, ene-yne compounds, organic nitrogen compounds, organic phosphorus compounds, oxime compounds, and phosphorus compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexyne-3-yne, and the like; methylalkenylcyclosiloxanes such as 2-ethynyl-4-methyl-2-pentene, 1,3,5,7-tetramethyl-1,3,5,7-tetravinylcyclotetrasiloxane, 1,3,5,7-tetramethyl-1,3,5,7-tetrahexenylcyclotetrasiloxane, and the like, as well as benzotriazoles.

The phosphorus-containing hydrosilylation reaction retarder may be at least one selected from a group consisting of phosphine compounds, phosphoric acid compounds, phosphonic acid compounds, phosphine oxide compounds, phosphite compounds, and phosphonic acid compounds. Examples include components described in Japanese Unexamined Patent Application 2007-308542, such as 1,3-bis(diphenylphosphino)propane and the like.

From the perspective of the curing behavior of the composition, the curable organopolysiloxane composition of the present invention is preferably curable at 80 to 200° C., with an increase in viscosity of 1.5-fold after 8 hours at room temperature following the preparation of the composition. Suppressed thickening is important from the perspective of handling workability, pot life, and post-curing properties, because curing at a high temperature (80 to 200° C.) above a certain level ensures curability. Note that such a composition can be achieved by selecting a suitable combination and compounded amounts of each of the components described above, the hydrosilylation catalyst, and the curing retarder.

[(D) Photo-Radical Polymerization Initiator]

Component (D) is a photo-radical polymerization initiator, which accelerates the photo-curing reaction of the acrylic group or methacrylic group of the silicon-bonded functional group ($R^A$) in component (A) by high energy beam irradiation. In particular, a cured product with easy releasability where the pressure-sensitive adhesive strength of the pressure-sensitive adhesive layer to the substrate is greatly reduced is formed by irradiating the pressure-sensitive adhesive layer containing a semi-cured product containing unreacted functional groups ($R^A$) derived from component (D) and component (A) with high energy beams.

The photoradical polymerization initiators are known to be broadly classified into photo-fragmentation and hydrogen abstraction types. The photoradical polymerization initiator used in the composition of the present invention can be selected arbitrarily from those known in the technical field, and is not limited to any particular initiator. Examples of the photo-radical polymerization initiator include α-ketol compounds such as 4-(2-hydroxyethoxy)phenyl (2-hydroxy-2-propyl) ketone, α-hydroxy-α, α'-dimethylacetophenone, 2-methyl-2-hydroxypropiophenone, 1-hydroxycyclohexyl phenyl ketone, and the like; acetophenone compounds such as methoxyacetophenone, 2,2-dimethoxy-2-phenylacetophenone, 2,2-diethoxyacetophenone, 2-methyl-1-[4-(methylthio)-phenyl]-2-morpholinopropane-1, and the like; benzoin ether compounds such as benzoin ethyl ether, benzoin isopropyl ether, anisoin methyl ether, and the like; ketal compounds such as benzyl dimethyl ketal and the like; aromatic sulfonyl chloride compounds such as 2-naphthalenesulfonyl chloride and the like; photo-active oxime compounds such as 1-phenone-1,1-propanedione-2-(o-ethoxycarbonyl)oxime and the like; benzophenone compounds such as benzophenone, benzoylbenzoic acid, 3,3'-dimethyl-4-methoxybenzophenone, and the like; thioxanthone compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, and the like; camphorquinone; halogenated ketones; acyl phosphinoxides; acyl phosphonates; and the like.

The amount of component (D) used can be appropriately designed according to the amount of the silicon-bonded functional group ($R^A$) derived from component (A), as well as the desired change in the pressure-sensitive adhesive strength and ease of releasability of a cured product triggered by irradiation with a high energy beam, but is preferably 0.1 to 20 parts by mass, and particularly preferably 0.5 to 15 parts by mass, with respect to 100 parts by mass of component (A).

[(D') Photosensitizer]

A photosensitizer (D') may be used in combination with an optionally selected photo-radical polymerization initiator (D). Use of a sensitizer can increase the photon efficiency of the polymerization reaction, and is particularly effective when the coating thickness of the composition is relatively thick or when a relatively long-wavelength LED light source is used, because use of longer wavelength light for the polymerization reaction compared to only using a photoinitiator is feasible. Examples of known sensitizers include anthracene-based compounds, phenothiazine-based compounds, perylene-based compounds, cyanine-based compounds, melocyanine-based compounds, coumarin-based compounds, benzylidene ketone-based compounds, and (thio)xanthene- or (thio)xanthone-based compounds such as isopropylthioxanthone, 2,4-diethylthioxanthone, squarylium-based compounds, (thia)pyrylium-based compounds, porphyrin-based compounds, and the like. Moreover, an arbitrary photosensitizer not limited thereto can be used in the curable organopolysiloxane composition and pressure-sensitive adhesive composition of the present invention. The amount used is arbitrary, but is commonly selected within a range where the mass ratio of component (D') to component (D) is 0 to 10, and if present, is within a range of 0.01 to 5.

[(E) Organopolysiloxane Resin]

In addition to components (A) to (D), the composition according to the present invention can contain (E) an organopolysiloxane resin. Component (E) is a component for optionally adjusting the adhesive strength to a substrate, and depending on the amount of the component used, can adjust the hardness of a semi-cured product after a hydrosilylation reaction and adhesion to the substrate.

It is an organopolysiloxane resin containing in a molecule (a) a siloxane unit (M unit) as expressed by $R_3SiO_{1/2}$ (where R mutually independently represents a monovalent organic group) and (b) a siloxane unit (Q unit) as expressed by $SiO_{4/2}$. The molar ratio of M units to Q units is preferably 0.5 to 2.0. This is because when the molar ratio is less than 0.5, adhesion to the substrate of the cured product may be reduced, whereas when the molar ratio is greater than 2.0, the cohesive strength of material forming the adhesive layer decreases.

In particular, the molar ratio of (a) M units to (b) Q units is preferably within a range of M units:Q units=0.50:1.00 to 1.50:1.00, more preferably within a range of 0.55:1.00 to 1.20:1.00, and even more preferably within a range of 0.60:1.00 to 1.10:1.00. The molar ratio can be easily measured by $^{29}Si$ nuclear magnetic resonance.

Component (E) is preferably an organopolysiloxane resin expressed by general unit formula: $(R_3SiO_{1/2})_a(SiO_{4/2})_b$ (where R mutually independently represents a monovalent organic group, a and b are positive numbers, respectively, and a +b=1 and a/b=0.5 to 1.5).

Component (E) may contain only (a) M units and (b) Q units, including the MVi units described above, but may also include an $R_2SiO_{2/2}$ unit (D unit) and/or $RSiO_{3/2}$ unit (T unit). Note that in the formula, R mutually independently represents a monovalent organic group. The total amount of (a) M units and (b) Q units in component (E) is preferably 50 weight % or more, more preferably 80 weight % or more, and particularly preferably 100 weight %.

The monovalent organic group is not particularly limited, but may be one or more organic groups selected from the silicon-bonded functional group ($R^A$) containing an acrylic group or methacrylic group expressed in general formula (1) and the silicon-bonded functional group ($R^{Vi}$) containing at least one aliphatic unsaturated carbon-carbon bond (but excluding the functional group serving as $R^A$ above) of component (A) described above, as well as other organic groups such as methyl groups and the like. Furthermore, component (E) may include a hydroxyl group or a hydrolyzable group such as an alkoxy group or the like, or may be an organopolysiloxane resin in which the amount of the hydroxyl group or hydrolyzable group is reduced by hydrolyzing these hydrolyzable groups with a silylating agent such as trimethylsilane or the like.

Component (E) is an optional component, and thus may be blended in an amount of 0.0 to 150 parts by mass relative to 100 parts by mass of component (A), preferably 0.5 to 50 parts by mass, and particularly preferably 1.0 to 20 parts by mass.

[(F) Polydimethylsiloxane which May Optionally have an Alkenyl Group]

The composition according to the present invention may also include polydimethylsiloxane, which may optionally have an alkenyl group. Component (F) is not involved in the crosslinking reaction of components (A) to (D) and optional component (E), but the viscosity required for coating with the curable organopolysiloxane composition, as well as the pressure-sensitive adhesion, hardness, crosslink density, and the like of the cured or semi-cured product can be adjusted by using this component, and furthermore, the release properties or the like of the cured product may be improved.

Herein, components (A) and component (E) are explicitly excluded from the range of component (F), and component (F) is preferably a cyclic, straight chain, branched chain, resinous, or raw rubber type polydimethylsiloxane in which a portion of the methyl groups may be replaced with an alkenyl group having 2 to 20 carbon atoms. The degree of siloxane polymerization and viscosity range thereof are not limited, but component (F) may be a liquid polydimethylsiloxane with a viscosity at 25° C. in a range of 1.5 to 1,000,000 mPa·s, or having a viscosity of 100,000 mPa·s or more at 25° C., or may be a raw rubber type polydimethylsiloxane having a plasticity measured in accordance with the method specified in JIS K6249 (determined by measuring the thickness to 1/100 mm when a load of 1 kgf is applied to a spherical sample of 4.2 g for 3 minutes at 25° C., multiplied by 100) in the range of 50 to 200. Furthermore, the amount of the vinyl (CH2═CH) moiety in the alkenyl group in component (F) (hereinafter referred to as "vinyl amount") is arbitrary, but may be in a range of 0.000 to 0.400 mass % or 0.005 to 0.300 mass %. Note that a cyclic polydimethylsiloxane with a degree of siloxane polymerization of 3 to 20, which may optionally have an alkenyl group, is included in the range of component (F).

[(G) Thiol Compound]

The compositions according to the present invention may further contain (G) a multifunctional thiol compound having at least two or more thiol groups in a molecule. The multifunctional thiol compound acts as chain transfer agent to promote a radical polymerization reaction, which can improve the curing rate and deep curability of a cured product even with a low amount of UV irradiation, and also serves as crosslinking point in the present composition.

Examples of the multifunctional thiol compound include pentaerythritol tetrakis(3-mercaptobutyrate), 1,4-bis(3-mercaptobutyryloxy)butane, 1,3,5-tris(2-(3-sulfanylbutanoyloxy)ethyl)-1,3,5 triazinane-2,4,6-trione, trimethylolpropane tris(3-mercaptobutyrate), and the like.

The use of component (G) is optional, the amount thereof is 0 to 20 parts by mass relative to 100 parts by mass of component (A), preferably 0 to 10 parts by mass, and particularly preferably 0 to 5 parts by mass.

[(H) Organic Solvent]

The composition according to the present invention can be designed as a composition with little or no solvent because the constituent components have relatively low viscosity, but (H) an organic solvent may be optionally added. The organic solvent may be used as a diluent to disperse or dissolve each component in order to improve the coatability and wettability of the composition on the substrate, or may be unavoidably included as solvents associated with other raw material components.

While not particularly limited, as long as the technical effects of the present invention are not impaired, the type of organic solvent used herein may be a compound which is soluble with all of the constituent components in the composition or a portion of the constituent components, and a type having a boiling point of 80° C. or higher and of 200° C. or lower is preferably used. The type of solvent can be a non-halogenated or halogenated solvent, aromatic hydrocarbon solvent, aliphatic hydrocarbon solvent, ester solvent, alcohol solvent, ether solvent, chlorinated aliphatic hydrocarbon solvent, volatile oil solvent, or the like, and combinations of two or more types can be used depending on the coatability, wettability, and the like.

More specifically, examples include non-halogen solvents such as i-propyl alcohols, t-butyl alcohol, cyclohexanol, cyclohexanone, methyl ethyl ketone, methyl isobutyl ketone, toluene, xylene, benzene, heptane, hexane, octane, isoparaffin, mesitylene, 1,4-dioxane, dibutyl ether, anisole, 4-methyl anisole, ethyl benzene, ethoxy benzene, ethylene glycol, diisopropyl ether, 1,4-dioxane, ethylene glycol dimethyl ether, ethylene glycol diethyl ether, 2-methoxy ethanol (ethylene glycol monomethyl ether), diethylene glycol dimethyl ether, diethylene glycol monomethyl ether, dipropylene glycol methyl ether acetate, ethyl acetate, butyl acetate, propyl propionates (=propyl propionate), 1-methoxy-2-propyl acetate, 1-ethoxy-2-propyl acetate, octamethyl cyclotetrasiloxane, hexamethyl disiloxane, and the like; and halogen solvents such as trichloroethylene, perchloroethylene, methylene chloride, trifluoromethyl benzene, 1,2-bis (trifluoromethyl)benzene, 1,3-bis (trifluoromethyl)benzene, 1,4-bis (trifluoromethyl)benzene, trifluoromethyl chlorobenzenes, trifluoromethyl fluorobenzene, hydrofluoroether, and the like.

The amount of organic solvent is less than 0 to 60 mass %, particularly preferably less than 50%, and substantially in a range of 0 to 30%, based on the total mass of the composition of 100 parts by mass. In particular, when components (A) to (D) and optionally components (F) or (G) and the like of the present invention are used, the solid fraction concentration that forms a solid fraction by the curing reaction can be easily designed to be in a range of 30 to 100 mass % of the entire composition.

[Other Optional Components]

The curable organopolysiloxane composition according to the present invention may optionally contain components other than the components described above to an extent that does not impair the technical effects of the present invention. For example, the composition may contain: an adhesion promoter; a non-reactive organopolysiloxane other than component (F) such as a polydimethyldiphenylsiloxane; an antioxidant such as a phenol-type, a quinone-type, an amine-type, a phosphorus-type, a phosphite-type, a sulfur-type, or a thioether-type antioxidant; a light stabilizer such as triazoles or benzophenones; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that in addition to these components, pigments, dyes, inorganic microparticles (reinforcing fillers, dielectric fillers, conductive fillers, thermally conductive fillers), and the like can be optionally blended.

The method of preparing the curable organopolysiloxane composition according to the present invention is not particularly limited and is performed by homogeneously mixing the respective components. An organic solvent may be added as necessary, and the composition may be prepared by mixing using a known stirrer or kneader. Note that the present composition has hydrosilylation reactivity when heated, and therefore is preferably mixed at a temperature of less than 100° C., preferably less than 50° C.

[Method of Use as Pressure-Sensitive Adhesive Layer]

The curable organopolysiloxane composition according to the present invention has both heat curability and photocurability by irradiation with a high energy beam because the composition contains the aforementioned component (A). In particular, the semi-cured product obtained by heat curing functions as a pressure-sensitive adhesive layer with excellent initial pressure sensitive adhesive strength, the pressure-sensitive adhesive strength to the substrate of the pressure-sensitive adhesive layer is greatly reduced by irradiating with a high energy beam, and the composition can be easily removed by forming an easily releasable cured product. The method of use will be described below.

[Application and Heat Curing]

The curable organopolysiloxane composition according to the present invention is applied to a substrate to form a coating film, which is then heated to a temperature of 80 to 200° C., preferably 90 to 150° C., to provide a semi-cured product that functions as a pressure-sensitive adhesive layer with excellent initial pressure-sensitive adhesive strength due to the hydrosilylation reaction. Note that the heating time required for curing can be selected according to the thickness of the pressure-sensitive adhesive layer and the amount of catalyst used, but is generally in a range of 0.5 to 90 minutes. The pressure-sensitive adhesive layer obtained by heat curing the composition according to the present invention contains unreacted silicon-bonded functional groups ($R^4$), and thus maintains further photo-curing reactivity triggered by irradiation with a high energy beam.

Examples of application methods include gravure coating, offset coating, offset gravure, roll coating, reverse roll coating, air knife coating, curtain coating, and comma coating. The coating amount can be designed at a desired thickness in accordance with the application such as a display device. For example, the thickness of the pressure-sensitive adhesive layer after curing may be from 1 to 1000 μm, from 5 to 900 μm, or from 10 to 800 μm. However, there is no limitation thereto.

The semi-cured product prior to the photo-curing reaction has sufficient initial pressure-sensitive adhesive strength. For example, when designing a pressure-sensitive adhesive layer with a thickness of 75 μm, a pressure-sensitive adhesive layer can be designed with a pressure-sensitive adhesive strength to an SUS plate at a tensile rate of 300 mm/min using the 180° peeling test method according to JIS Z 0237 that is 2.5 gf/inch or higher, preferably, 3.0 gf/inch or higher, and particularly 3.0 to 50.0 gf/inch. Note that the thickness (75 μm) described above is the thickness of the cured layer itself serving as a reference for objectively defining the pressure-sensitive adhesive strength of the cured layer according to the present invention. It goes without saying that the curable organopolysiloxane composition of the present invention is not limited to a thickness of 75 μm and may be used as a cured layer or a pressure-sensitive adhesive layer of an arbitrary thickness.

[Change in Pressure-Sensitive Adhesive Strength by Irradiation with High Energy Beam]

The pressure-sensitive adhesive layer, which is a semi-cured product obtained by heat curing, undergoes a further photo-curing reaction triggered by irradiation with a high energy beam, greatly reducing the pressure-sensitive adhesive strength, forming a hard cured product that is easily releasable and that does not leave adhesive residue on the substrate, or the like, allowing the layer to be easily released from the substrate. Specifically, when the organopolysiloxane semi-cured product obtained by a heat curing reaction is closely adhered to another substrate, the pressure-sensitive adhesive strength to the substrate decreases by 10% or more, preferably 30% or more, and particularly preferably 50% or more, before and after a photo-curing reaction by irradiation with a high energy beam. Note that such changes in the pressure-sensitive adhesive strength can be quantitatively measured by a pressure-sensitive adhesive strength measurement test using the aforementioned SUS plate or the like.

Examples of the high energy beam used in the photo-curing reaction (also referred to as active energy beam) include UV rays, electron beams, radiation beams, and the like, but UV rays are preferable from the perspective of practicality. As the UV ray generating source, a high-pressure mercury lamp, a medium-pressure mercury lamp, a Xe—Hg lamp, a deep UV lamp, or the like is suitable, and in particular, UV ray irradiation with a wavelength of 280 to 400 nm, preferably with a wavelength of 300 to 400 nm is preferable, and a light source with a plurality of light emission bands may be used.

Although the irradiation amount of the high energy beam can be designed as appropriate, when the UV irradiation amount (irradiance) is 100 $mJ/cm^2$ to 10,000 $mJ/cm^2$, and preferably 1,000 $mJ/cm^2$ to 5,000 $mJ/cm^2$ as the integrated light intensity, the high energy beam irradiation triggers a favorable change in the pressure-sensitive adhesive strength of the pressure-sensitive adhesive layer according to the present invention. Note that the high energy beam irradiation may be performed with the substrate sandwiched in between, so long as the substrate supporting the pressure-sensitive adhesive layer according to the present invention does not absorb electromagnetic waves in the above wavelength region. In other words, if a certain amount of irradiation is feasible, high energy beam irradiation may be performed over a cover material such as a substrate, protective film, or the like.

[Properties Related to Transparency, Color Tone, or Coloration and Discoloration of Pressure-Sensitive Adhesive Layer]

The pressure-sensitive adhesive layer (including semi-cured and cured products) obtained by curing the curable organopolysiloxane composition and organopolysiloxane pressure-sensitive adhesive composition according to the present invention may be substantially transparent, semi-transparent or opaque, and the transparency can be designed according to the application of the pressure-sensitive adhesive layer. When it is visually transparent, or more objectively, when the value for air is 100%, the transmittance of light at a wavelength of 450 nm of the pressure-sensitive adhesive layer formed from a cured layer having a thickness of 100 μm is 80% or higher, and preferably 90% or higher, and may be designed so as to be 95% or higher. On the other hand, with the pressure-sensitive adhesive or the like for temporary retaining or the like when light transmissivity is not required, a semi-transparent to opaque pressure-sensitive adhesive layer may be used with a filler component or additive which impairs colorability or light transmittance.

[Method of Use as Pressure-Sensitive Adhesive Layer, Pressure-Sensitive Adhesive Sheet with Change in Pressure-Sensitive Adhesive Properties Before and After High Energy Beam Irradiation]

In order to improve adhesion with an adherend, the pressure-sensitive adhesive layer of the present invention may be subjected to a surface treatment such as primer treatment, corona treatment, etching treatment, plasma treatment, and the like on the surface of the pressure-sensitive adhesive layer according to the present invention or the substrate. However, the adhesion layer of the present invention has excellent adhesion to a substrate of a display device and the like as described above. Therefore, these steps may be added, as required, to further improve adhesion with the adherend, with a higher production efficiency capable of being achieved by eliminating these steps.

The curable organopolysiloxane composition according to the present invention is semi-cured by a condensation reaction by applying the composition to a release liner, then heating under the temperature conditions described above, and after the release liner is peeled off and the composition is attached to a film-like substrate, a tape-like substrate, or a sheet-like substrate (hereinafter, referred to as a "film-like substrate") or applied to a film-like substrate, curing by heating at the temperature conditions described above so as to form a pressure-sensitive adhesive layer on the surface of the substrate can be performed. As described above, the pressure-sensitive adhesive layer has excellent initial adhesion and contains a photo-curable functional group derived from component (A), which is triggered by high energy beam irradiation to decrease pressure-sensitive adhesive strength and change pressure-sensitive adhesive properties on easy releasability.

A laminate body, provided with a cured layer, in particular, a film-like cured layer, obtained by curing the organopolysiloxane composition according to the present invention on a film-like substrate, may be used as adhesive tape, detachable protective film, adhesive bandage, low temperature support, transfer film, label, emblem, and decorative or explanatory sign. Further, a cured layer obtained by curing the organopolysiloxane composition according to the present invention may be used to assemble automobile parts, toys, electronic circuits, or keyboards. Alternatively, a cured layer formed by curing the organopolysiloxane composition according to the present invention, particularly a film-like adhesive layer, may be used in the protection, construction, and use of a laminated touch screen or flat panel display.

Exemplary types of substrates include paperboard, cardboard paper, clay-coated papers, polyolefin laminate papers, particularly polyethylene laminate papers, synthetic resin films and sheets, natural fiber woven materials, synthetic fiber woven materials, artificial leather materials, and metal foils. In particular, synthetic resin films and sheets are preferable, exemplary synthetic resins including: polyimides, polyethylenes, polypropylenes, polystyrenes, polyvinyl chlorides, polyvinylidene chlorides, polycarbonates, polyethylene terephthalates, cyclopolyolefins, and nylons. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. At the same time, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or sheet-like substrate. The thickness thereof is not particularly limited and can be designed with a desired thickness in accordance with the application. Furthermore, in order to improve the adhesion between a supporting film and cured adhesive layer, a supporting film subjected to a primer treatment, corona treatment, etching treatment, or plasma treatment may be used. Furthermore, the surface of the film-like substrate on the opposite side as the cured layer or cured adhesive layer surface may be subjected to surface treatments such as a treatment for scratch prevention, grime prevention, fingerprint adhesion prevention, anti-glare, anti-reflection, antistatic, or the like.

The pressure-sensitive adhesive layer according to the present invention may be a single layer or a multilayer structure obtained by laminating two or more pressure-sensitive adhesive layers in accordance with the required properties. The multilayered pressure-sensitive adhesive layer may be obtained by mutually adhering films prepared one layer at a time, or by performing a process of coating and curing the curable silicone composition a plurality of times, such as on a film substrate with a release layer or the like.

The pressure-sensitive adhesive layer according to the present invention may serve as another functional layer selected from a dielectric layer, conductive layer, heat dissipation layer, insulating layer, reinforcing layer, and the like, in addition to providing bonding or closely adhering between members. In particular, the pressure-sensitive adhesive layer, which is a semi-cured product obtained by heat curing the curable organopolysiloxane according to the present invention, has excellent initial adhesion and contains a photo-curable functional group derived from component (A), which is triggered by high energy beam irradiation to decrease pressure-sensitive adhesive strength and change pressure-sensitive adhesive properties on easy releasability, thereby forming a cured adhesion layer that can be very easily removed from a substrate surface by high energy beam after fixing or adhering with the desired device or process. Therefore, the pressure-sensitive adhesive layer is very useful for temporary fixing or the like of a temporary functional layer or a supposedly detachable functional layer.

For the case of a pressure-sensitive adhesive layer obtained by heat curing the curable organopolysiloxane composition of the present invention, in particular, a pressure-sensitive adhesive sheet with a change in pressure-sensitive adhesive properties before and after high energy beam irradiation, the pressure-sensitive adhesive layer is preferably handled as a laminated body film closely adhered in a releasable state on a film substrate provided with a release layer with release coating capability. The release layer may also be referred to as a release liner, a separator, a release layer, or a release coating layer, and may preferably be a release layer having a release coating function such as a silicone-based release agent, a fluorine-based release agent, an alkyd-based release agent, a fluorosilicone-based release agent, or the like, or may have physically fine irregularities formed on a substrate surface, such that the adhesive layer of the present invention will not easily adhered to the substrate. In particular, the laminated body according to the present invention preferably has a release layer obtained by curing a fluorosilicone release agent as the release layer.

The pressure-sensitive adhesive layer according to the present invention has the characteristic pressure-sensitive adhesive properties described above and can achieve transparency and low haze, and thus is useful as an elastic adhesion layer or temporary fixing layer, as a member of various electronic apparatuses or electrical devices, and as a protective film during processing of a semiconductor wafer. Similarly, the cured product is also useful as an electronic material, a member for a display device, or a member for a transducer (including sensors, speakers, actuators, and generators), and a suitable application for the cured product is a member of an electronic component or display device. The cured product according to the present invention may be transparent or opaque, and in particular, a film-shaped cured product, particularly a substantially transparent protective film, is suitable as a member of a display panel or display, and is particularly useful in so-called touch panel applications in which a device, particularly an electronic device, can be operated by touching a screen with a fingertip or the like. Note that the cured product layer of the present invention is not required to have transparency, and may be suitable for applications as a film or sheet-like member that is used in sensors, speakers, actuators, and the like that require a certain degree of elasticity or flexibility of the adhesive layer itself.

[Use as an Adhesive Tape]

An article containing a cured layer obtained by curing the curable silicone composition of the present invention can be an adhesive tape, and particularly a supposedly detachable protective tape, and has a sheet-like member made of the aforementioned adhesive layer and a synthetic resin film or sheet, metal foil, woven material, nonwoven material, paper, or other fiber product. The type of adhesive tape is not particularly limited, and includes insulating tapes, heat-resistant tapes, solder masking tapes, mica tape binders, temporary fixing tapes (including in particular temporary fixing tapes for silicone rubber parts, and the like), splicing tapes (including in particular splicing tapes for silicone release paper).

In particular, a cured product, and particularly a cured product layer, obtained by curing the curable silicone composition of the present invention has excellent initial adhesion and contains a photo-curable functional group derived from component (A), which is triggered by high energy beam irradiation to decrease pressure-sensitive adhesive strength and change pressure-sensitive adhesive properties to be more easily releasable, thereby allowing for stable adhesion properties and the appearance of a adhesion layer and for easy removal from a substrate surface by irradiation of UV rays or the like after use. Therefore, the cured product is particularly suitable for a supposedly detachable functional film used temporarily for display devices, semiconductors, and the like. In particular, as described below, the present invention is extremely useful as a pressure-sensitive adhesive for temporarily fixing for use when manufacturing a display device such as a CRT display, liquid crystal display, plasma display, organic EL display, inorganic EL display, LED display, surface electrolytic display (SED), field emitting display (FED), and other display devices, or touch panels using the display devices.

[Laminate Body and Adhesive Sheet]

A laminate body with a cured adhesive layer made by curing the curable silicone composition may be formed on a film substrate, and suitably, these film substrates may be provided with a release layer for the cured adhesive layer.

The laminate body of the present invention preferably has a sheet-like substrate with at least one release layer, and the release layer is preferably in contact with the cured adhesive layer. Therefore, the cured adhesive layer can easily be peeled off from the sheet-like substrate. The release agent contained in the release layer is not particularly limited, and the same release agents as described above may be suggested.

In particular, the laminate body may be able to handle the adhesive layer separated from the film-like substrate alone, or there may be two film-like substrates.

Specifically, the laminate body may have:

- a film-like substrate;
- a first release layer formed on the film-like substrate;
- a pressure-sensitive adhesive layer formed by applying, heating, and curing the curable organopolysiloxane composition on the release layer; and
- a second release layer laminated on the adhesive layer.

Furthermore, a laminate body with this form may be produced, for example, by interposing the curable silicone composition described above between the first film-like substrate and the second film-like substrate, to form a layer to a certain thickness by pressing or rolling while heating, and then curing the composition.

The first sheet substrate may be provided with a first release layer, or the first sheet substrate itself may be provided with releasability. Similarly, the second sheet substrate may be provided with a second release layer, or the second sheet substrate itself may be provided with releasability.

When the first sheet substrate and/or the second sheet substrate is provided with a first release layer and/or a second release layer, the cured adhesive layer is preferably in contact with the first release layer and/or the second release layer.

For example, the sheet substrate having releasability includes a sheet substrate made of a material having releasability such as a fluororesin film, or a sheet substrate made of a material having no or low releasability such as a polyolefin film to which a release agent such as silicone, fluororesin, or the like has been added. On the other hand, the sheet substrate provided with the release layer includes, for example, a polyolefin film and the like, coated with a release agent such as silicone, fluororesin, or the like.

The aforementioned laminate body can be used, for example, by peeling the adhesive layer from the film substrate after applying the cured adhesive layer to the adherend.

The thickness of the adhesion layer (pressure-sensitive adhesive layer) obtained by heat curing the curable organopolysiloxane composition according to the present invention is preferably 5 to 10,000 μm, preferably 10 μm or more or 8,000 μm or less, and particularly preferably 20 μm or more and 5,000 μm or less.

[Member for Display Panel or Display]

The adhesion layer (pressure-sensitive adhesive layer) obtained by heating and curing the curable organopolysiloxane composition of the present invention can be used for protection, construction, or use in a laminate touch screen or flat panel display, and the specific method of use can be a commonly known method of use of adhesion layers (e.g., silicone PSA, silicone adhesives, and silicone sealing agents), without particular limitation.

INDUSTRIAL APPLICABILITY

The application of the co-modified organopolysiloxane according to the present invention, a curable organopolysiloxane composition containing the same, and a pressure-sensitive adhesive layer obtained by semi-curing/curing the same are not limited to those disclosed above, and a film provided with the cured product obtained by curing the composition can be used in various display devices for displaying characters, symbols and images. The surface shape of such a display device may be a curved shape or a bowed shape rather than a flat surface, with examples thereof including curved displays or curved transmission screens used in automobiles (including electric vehicles), aircraft, or the like, in addition to various flat panel displays (FPDs). Furthermore, these display devices may have an additional touch panel function that allows input operations by touching icons, notification displays, or operation buttons for executing functions or programs on the screen or display using a finger. Application thereof is possible as a device for CRT displays, liquid crystal displays, plasma displays, organic EL displays, inorganic EL displays, LED displays, surface electrolytic displays (SEDs), field emitting displays (FEDs), and other display devices, or touch panels using the display devices. Moreover, the cured product obtained by curing the composition has excellent adhesion to a substrate and viscoelastic properties, and can be used as a film-like or sheet-like member, which is a member for transducers such as a membrane for speakers (including a sensor, speaker, actuator, and generator), in addition to also being capable of being used as a sealing layer or adhesive layer used in a secondary battery, fuel cell, or solar cell module.

EXAMPLES

Hereinafter, the present invention is described in detail with reference to the examples and comparative examples, but the present invention is not limited to the following examples. In addition, due to the nature of the semi-cured product according to the present invention, the high energy beam irradiation is not performed at the same time during heat curing.

(Measurement of Molecular Weight of Organopolysiloxane Component)

Using gel permeation chromatography (GPC) available from Waters and tetrahydrofuran (THF) as a solvent, the weight average molecular weight (Mw) and number average molecular weight (Mn) of organopolysiloxane components such as organopolysiloxane resin were determined in terms of standard polystyrene.

Synthesis Example 1

A solution in which 100.0 g of an alkenyl group-modified polysiloxane expressed by the following formula:

[Chem. FIG. 3]

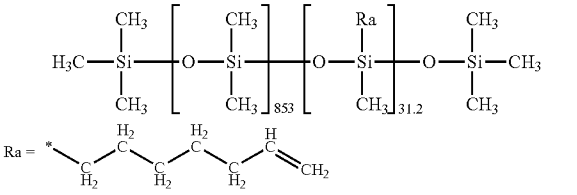

is diluted in 35.0 g of toluene was mixed with 10.5 g of 3-(1,1,3,3-tetramethyldisiloxanyl)propyl methacrylate and 0.0500 g of 4-methoxyphenol. 0.0500 g of a toluene solution of a platinum/1,3-divinyltetramethyldisiloxane complex (containing $1.0\times10^{-4}$ g of Pt as a single substance) was added thereto, and the mixture was stirred for four hours while the temperature was adjusted to 25° C. to 45° C. In this case, the ratio of the number of SiH groups to hexenyl groups is 0.88. IR spectroscopy confirmed the disappearance of the SiH group, and 145.6 g of a toluene solution of a straight chain organopolysiloxane (A-1) expressed by the following formula:

[Chem. FIG. 4]

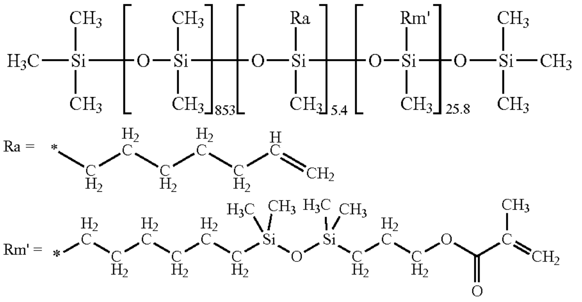

with a molar ratio of methacrylate groups to hexenyl groups of 4.7 was obtained. The molar ratio of methacrylate groups to hexenyl groups was determined by 13CNMR.

Synthesis Example 2

The experimental operation and the amounts of side-chain hexenyl group-modified polysiloxane, platinum catalyst, polymerization inhibitor, and solvent used as raw materials were the same as in Synthesis Example (1) above, and the amount of 3-(1,1,3,3-tetramethyldisiloxanyl)propyl methacrylate used was set to 6.7 g such that 141.7 g of a toluene solution of organopolysiloxane (A-2) on a straight chain was obtained, in which the molar ratio of methacrylates group to hexenyl groups is 4.2.

Synthesis Example 3

A solution with 100.0 g of a side chain vinyl group-substituted polysiloxane expressed by the following formula:

[Chem. FIG. 5]

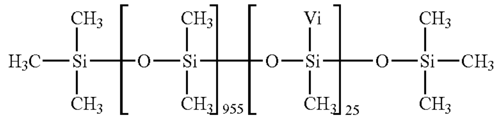

(where Vi represents $CH{=}CH_2$)

diluted in 35.0 g of toluene was mixed with 7.1 g of 3-(1,1,3,3-tetramethyldisiloxanyl)propyl=methacrylate and 0.1000 g of 4-methoxyphenol. 0.1000 g of a toluene solution of a platinum/1,3-divinyltetramethyldisiloxane complex (containing $2.0\times10^{-4}$ g of elemental Pt) was added thereto, and the mixture was stirred for four hours while the temperature was adjusted to 40° C. to 50° C. In this case, the ratio of the number of SiH groups to vinyl groups bonded to a silicon atom is 0.80. IR spectroscopy confirmed the disappearance of the SiH group, and 142.1 g of a toluene solution of straight chain organopolysiloxane (A-3) expressed by the following formula:

[Chem. FIG. 6]

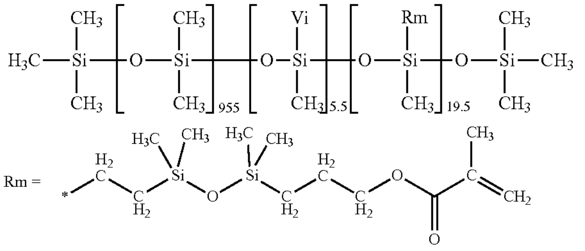

with a molar ratio of methacrylate groups to vinyl groups of 3.5 was obtained. The molar ratio of methacrylate groups to vinyl groups was determined by 13CNMR.

Synthesis Example 4

The experimental operation and the amounts of side-chain vinyl group-modified polysiloxane, platinum catalyst, polymerization inhibitor, and solvent used as raw materials were the same as in Synthesis Example (3) above, and the amount of 3-(1,1,3,3-tetramethyldisiloxanyl)propyl methacrylate used was set to 1.6 g such that 136.6 g of a toluene solution of a straight chain organopolysiloxane (A-4) was obtained, in which the molar ratio of methacrylates group to vinyl groups is 0.2.

Synthesis Example 5

25.0 g of a xylene solution containing a 18.8 g of an organopolysiloxane resin, which contains in a molecule a siloxane unit (M unit) expressed by $R_3SiO_{1/2}$ (where R mutually independently represents a methyl group or vinyl group) and a siloxane unit (Q unit) expressed by $SiO_{4/2}$, was mixed with 0.48 g of 3-(1,1,3,3-tetramethyldisiloxanyl)propyl methacrylate and 0.0290 g of 4-methoxyphenol. 0.0240 g of a toluene solution of a platinum/1,3-divinyltetramethyldisiloxane complex (containing $4.8\times10_{-5}$ g of Pt as a single substance) was added thereto, and the mixture was stirred for four hours while the temperature was adjusted to 40° C. to 50° C. In this case, the ratio of the number of methacrylate groups to vinyl groups included in the organopolysiloxane resin is 0.1. IR spectroscopy confirmed the disappearance of the SiH group, and 25.5 g of the xylene solution containing an organopolysiloxane resin (E-3), which contains in a molecule a siloxane unit (M unit) expressed by $R_3SiO_{1/2}$ (where R mutually independently represents a methyl group or vinyl group) and a siloxane unit (Q unit) expressed by $SiO_{4/2}$, was obtained.

Component (A-1): Straight chain organopolysiloxane indicated in Synthesis Example (1) (amount of vinyl groups: 0.20 mass %, amount of methacrylate groups: 2.94 mass %)

Component (A-2): Straight chain organopolysiloxane indicated in Synthesis Example (2) (amount of vinyl groups: 0.15 mass %, amount of methacrylate groups: 1.97 mass %)

Component (A-3): Straight chain organopolysiloxane indicated in Synthesis Example (4) (amount of vinyl groups: 0.19 mass %, amount of methacrylate groups: 2.12 mass %)

Component (A-4): Straight chain organopolysiloxane indicated in Synthesis Example (5) (amount of vinyl groups: 0.77 mass %, amount of methacrylate groups: 0.43 mass %)

Component (A-5): A dimethylsiloxy-(5-hexenyl)methylsiloxane copolymer raw rubber blocked at both ends by trimethylsiloxy groups with a plasticity of 110 (amount of vinyl groups: 0.57 mass %)

Component (A-6): A dimethylsiloxy-(5-hexenyl)methylsiloxane copolymer blocked at both ends by trimethylsiloxy groups (amount of vinyl groups: 0.57 mass %)

Component (A-7): A dimethylsiloxane-methylvinylsiloxane copolymer blocked at both ends by trimethylsiloxy groups (amount of vinyl groups: 0.91 mass %)

Component (B): A dimethylsiloxane-methylhydrogensiloxane copolymer blocked at both ends by trimethylsiloxy groups (amount of vinyl groups: 0.75 mass %)

Component (C): Dimethylsiloxane polymer solution blocked at both ends by vinyldimethylsiloxy groups of a platinum-1,3-divinyl 1,1,3,3-tetramethyldisiloxane complex (approximately 0.7 mass % in platinum concentration)

Component (D): 2,2-dimethoxy-2-phenylacetophenone (CAS #: 24650-42-8, available from Tokyo Chemical Industry Co., Ltd.)

Component (E-1): An organopolysiloxane resin containing in a molecule a siloxane unit (M unit) expressed by $R_3SiO_{1/2}$ (where R mutually independently represents a methyl group or vinyl group) and a siloxane unit (Q unit) expressed by $SiO_{4/2}$ (weight average molecular weight of 4000, as measured by GPC using toluene as a solvent)

Component (E-2): An organopolysiloxane resin containing in a molecule a siloxane unit (M unit) expressed by $R_3SiO_{1/2}$ (where R mutually independently represents a methyl group or vinyl group) and a siloxane unit (Q unit) expressed by $SiO_{4/2}$ (weight average molecular weight of 7000, as measured by GPC using toluene as a solvent)

Component (E-3): An organopolysiloxane resin containing in a molecule a siloxane unit (M unit) expressed by $R_3SiO_{1/2}$ (where R mutually independently represents a methyl group or vinyl group) and a siloxane unit (Q unit) expressed by $SiO_4/2$, as described in Synthesis Example 5 (weight average molecular weight of 7500, as measured by GPC using toluene as a solvent)

Component (E-4): Organopolysiloxane resin indicated in Synthesis Example (6) (amount of vinyl groups: 0.77 mass %, amount of methacrylate groups: 0.43 mass %)

Component (F-1): Dimethylpolysiloxane blocked at both molecular chain ends with dimethylvinylsiloxy groups, expressed by formula $ViMe_2SiO(Me_2SiO)_{300}SiViMe_2$ (amount of vinyl groups=0.24 mass %)

Component (F-2): A dimethylpolysiloxane raw rubber blocked at both molecular chain ends with dimethylvinylsiloxy groups with a plasticity of 60 (amount of vinyl groups: 0.01 mass %)

Examples 1 to 12, Comparative Examples 1 to 3

Examples of the present invention and comparative examples are described hereinafter. Note that "cured" in each of the examples and comparative examples indicates that each composition has fully cured or semi-cured under the respective curing conditions.

(Preparation of a Curing-Reactive Silicone Composition)

Pressure-sensitive adhesive compositions containing the curing-reactive organopolysiloxane compositions indicated in each of the examples and comparative examples were prepared using the components shown in Table 1. Note that all percentages in Table 1 refer to mass %.

(Pressure-Sensitive Adhesive Strength Measured Initially and after UV Irradiation)

Each composition was applied to a PET film (available from Toray Co., Ltd., product name: Lumirror (registered trademark) S10, thickness: 50 μm) such that the thickness after curing was 75 μm, after which it was cured for three minutes at 100° C. After leaving for 30 minutes, the sample was cut to a width of 25 mm and a pressure-sensitive adhesive layer surface was attached to a SUS plate (available from Paltech) using a roller to obtain a test piece. The pressure-sensitive adhesive strength measured on a SUS plate at a tensile rate of 300 mm/min using the 180° peel test method in accordance with JIS Z 0237 is shown in Table 1 as "Initial pressure-sensitive adhesive strength". In addition, the test piece was irradiated with UV rays with a wavelength of 365 nm from a PET surface side using a UV-LED UV irradiation device (available from JATEC) such that the amount of UV irradiation (irradiance) was 2,000 mJ/cm$^2$ as an integrated light intensity. The pressure-sensitive adhesive strength of the test piece after UV irradiation was measured in the same manner as described above and is shown in Table 1 as "Pressure-sensitive adhesive strength after UV irradiation". Note that if the pressure-sensitive adhesive layer became cloudy and visibility was lost due to UV light irradiation, it was evaluated as "X".

TABLE 1

| | EXAMPLES | | | | | | | |
|---|---|---|---|---|---|---|---|---|
| Component | 1 | 2 | 3 | 4 | 5 | 6 | 7 | 8 |
| A-1 | 100 | | | | | | | |
| A-2 | | 100 | | | 100 | 100 | 100 | 100 |
| A-3 | | | 100 | | | | | |
| A-4 | | | | 100 | | | | |
| A-5 | | | | | | 2.4 | | |
| A-6 | | | | | | | | |
| A-7 | | | | | | | | |
| B | 0.42 | 0.54 | 0.47 | 0.63 | 0.5 | 0.4 | 0.7 | 0.6 |
| D | 3 | 3 | 3 | 3 | 3 | 3 | 3 | 3 |
| E-1 | | | | | 25.3 | | | |
| E-2 | | | | | | 11.8 | | |
| E-3 | | | | | | | 1.1 | |
| E-4 | | | | | | | | 2.1 |
| F-1 | | | | | | | | |
| F-2 | | | | | | | | |
| Amount of platinum ppm | 30 | 30 | 30 | 30 | 30 | 30 | 30 | 30 |

TABLE 1-continued

| | | | | | | | | |
|---|---|---|---|---|---|---|---|---|
| H/Vi | 0.76 | 0.76 | 0.75 | 0.19 | 0.9 | 0.79 | 0.76 | 0.72 |
| Mol % of photo-sensitive functional group | 1.6 | 1 | 1 | 0.2 | 1 | 1 | 1 | 1 |
| Initial pressure-sensitive adhesive strength (*1) | 8.9 | 15.5 | 6.5 | 11.5 | 11 | 12 | 11 | 19 |
| Pressure-sensitive adhesive strength after UV irradiation (*2) | 3.8 | 3.3 | 2.8 | 8.6 | 5 | 4 | 3.8 | 3.8 |
| Rate of decrease | 43% | 21% | 43% | 75% | 45% | 33% | 35% | 20% |
| MA/ unsaturation rate | 6.3 | 4.2 | 3 | 0.2 | 4.2 | 4.2 | 4.2 | 4.2 |

| | EXAMPLES | | | | | Comparative Examples | | |
|---|---|---|---|---|---|---|---|---|
| Component | 9 | 10 | 11 | 12 | 13 | 1 | 2 | 3 |
| A-1 | | | | | 100 | | | |
| A-2 | 100 | 100 | 100 | 100 | | | | |
| A-3 | | | | | | | | |
| A-4 | | | | | | | | |
| A-5 | | 6.6 | | 2.3 | | 100 | | |
| A-6 | | | | | | | 100 | |
| A-7 | | | | | | | | 100 |
| B | 0.6 | 0.5 | 1 | 0.7 | 0.1 | 0.52 | 0.52 | 0.36 |
| D | 3 | 3 | 3 | 3 | 10 | 3 | 3 | 3 |
| E-1 | | | | | | | | |
| E-2 | | | | | 150 | | | |
| E-3 | | | 1.2 | 2.5 | | | | |
| E-4 | | | | | | | | |
| F-1 | 12 | | 10.9 | 4.3 | | | | |
| F-2 | | | | | 83 | | | |
| Amount of platinum ppm | 30 | 30 | 30 | 30 | 30 | 30 | 30 | 30 |
| H/Vi | 0.66 | 0.69 | 1.02 | 0.94 | 0.23 | 0.14 | 0.14 | 0.1 |
| Mol % of photo-sensitive functional group | 1 | 1 | 1 | 1 | 1.6 | 0 | 0 | 0 |
| Initial pressure-sensitive adhesive strength (*1) | 11.3 | 7.2 | 10.9 | 9.5 | 100 | 2.2 | 7.5 | 13.2 |
| Pressure-sensitive adhesive strength after UV irradiation (*2) | 3.2 | 2.7 | 3.7 | 3.5 | 37 | x | x | x |
| Rate of decrease | 28% | 38% | 34% | 37% | 37% | | Transparency loss | |
| MA/ unsaturation rate | 4.2 | 4.2 | 4.2 | 4.2 | 10.6 | 0 | 0 | 0 |

(*1) Initial pressure-sensitive adhesive strength to SUS plate (gf/inch)

(*2) Pressure-sensitive adhesive strength after UV irradiation to SUS plate (gf/inch)

As shown in Table 1, the heat cured products of the composition containing the co-modified organopolysiloxane of the present invention according to Examples 1 to 12 have an initial adhesive strength in a range sufficient for practical use, and can achieve a pressure-sensitive adhesive strength in a certain range by composition design. Furthermore, the pressure-sensitive adhesive layer had pressure-sensitive adhesive strength greatly reduced by UV irradiation, change in pressure-sensitive adhesive properties to be easy releasable, and maintained transparency. Therefore, it is expected to excel in usefulness as a protective film, temporary fixing film, and the like when used in a manufacturing process of a semiconductor wafer and the like and display devices, electronic devices, and the like. On the other hand, when an organopolysiloxane having only a vinyl group was used, as in Comparative Examples 1 to 3, only slight pressure-sensitive adhesive properties could be achieved, and transparency (visibility) was lost due to UV irradiation. Therefore, it was difficult to maintain the initial pressure-sensitive adhesive strength, easy releasability after use, and transparency unless the co-modified organopolysiloxane of the present invention was used.

The invention claimed is:

1. A chain co-modified organopolysiloxane, comprising in a molecule:

a silicon-bonded functional group ($R^A$) containing an acrylic group or methacrylic group, as expressed by the following General Formula (1-1); and a silicon-bonded functional group ($R^{Vi}$) containing at least one aliphatic unsaturated carbon-carbon bond, but excluding the functional group serving as $R^A$ above;

General Formula (1-1)

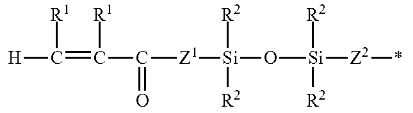

where $R^1$ mutually independently represents a hydrogen atom, a methyl group, or a phenyl group; $R^2$ mutually independently represents an alkyl group or an aryl group; $Z^1$ represents $—O(CH_2)_m—$ where m is a number within a range of 0 to 3; and $Z^2$ represents a divalent organic group expressed by $—(CH_2)_n—$ where n is a number within a range of 2 to 10, bonded to a silicon atom configuring a main chain of a polysiloxane represented by *.

2. The co-modified organopolysiloxane according to claim 1, wherein the functional group ($R^{Vi}$) is an alkenyl group having 2 to 20 carbon atoms.

3. The co-modified organopolysiloxane according to claim 1, wherein the functional group ($R^{Vi}$) is a hexenyl group.

4. The co-modified organopolysiloxane according to claim 1, wherein two or more of the functional groups ($R^{Vi}$) are provided in a molecule.

5. The co-modified organopolysiloxane according to claim 1, wherein m is a number within a range of 1 to 3 and n is a number within a range of 3 to 6.

6. The co-modified organopolysiloxane according to claim 1, comprising in a molecule the silicon-bonded functional group ($R^A$) containing an acrylic group or methacrylic group per mol of the silicon-bonded functional group ($RV^1$) containing at least one aliphatic unsaturated carbon-carbon bond but excluding the functional group serving as $R^A$ above, in a range at which the average amount thereof is 2.0 to 50.0 mols.

7. The co-modified organopolysiloxane according to claim 1, wherein in a molecule, the amount of the silicon-bonded functional group ($R^A$) containing an acrylic group or methacrylic group is within a range of 0.10 to 10.0 mol % with respect to all functional groups bonded to a silicon atom configuring a polysiloxane molecule.

8. The co-modified organopolysiloxane according to claim 1, wherein the main chain of the polysiloxane is a straight chain.

9. A curable organopolysiloxane composition, comprising:

(A) 100 parts by mass of the co-modified organopolysiloxane according to claims 1;

(B) 0.1 to 5 parts by mass of an organohydrogenpolysiloxane having at least two silicon-bonded hydrogen atoms in a molecule;

(C) a hydrosilylation reaction catalyst in an amount at which the amount of a platinum-based metal in the catalyst is 0.01 to 1000 pm; and (D) 0.1 to 20 parts by mass of a photo-radical polymerization initiator.

10. The curable organopolysiloxane composition according to claim 9, further comprising:

(E) 0.5 to 150 parts by mass of an organopolysiloxane resin containing a siloxane unit (M unit) expressed by $R_3SiO_{1/2}$ where R mutually independently represents a monovalent organic group and a siloxane unit (Q unit) expressed by $SiO_{4/2}$, such that the ratio of the M unit to the Q unit is within a range of 0.5 to 2.0.

11. The curable organopolysiloxane composition according to claim 9, further comprising:

(F) a polydimethylsiloxane which may optionally have an alkenyl group.

12. The curable organopolysiloxane composition according to claim 9, having both heat curability and photocurability by irradiation with a high energy beam.

13. The curable organopolysiloxane composition according to claim 9, wherein when an organopolysiloxane semi-cured product obtained by a heat curing reaction of the curable organopolysiloxane composition is closely adhered to another substrate, the pressure-sensitive adhesive strength to the substrate decreases by 50% or more before and after a photo-curing reaction by irradiation with a high energy beam.

14. An organopolysiloxane pressure-sensitive adhesive composition, comprising the co-modified organopolysiloxane according to claim 1.

15. An organopolysiloxane pressure-sensitive adhesive layer obtained by curing or semi-curing the curable organopolysiloxane composition according to claim 9.

16. A method for using the organopolysiloxane pressure-sensitive adhesive composition, comprising:

(I): a step of applying the organopolysiloxane pressure-sensitive adhesive composition according to claim 14 on a substrate;

(II): a step of semi-curing the organopolysiloxane pressure-sensitive adhesive composition applied in step (I) by a heat curing reaction; and (III): a step of irradiating a semi-cured product obtained in step (II) with a high energy beam to further cure the semi-cured product by a photo-curing reaction;

wherein the pressure-sensitive adhesive strength of the semi-cured product obtained in step (II) to another substrate is reduced by the irradiation with the high energy beam in step (III).

17. The curable organopolysiloxane composition according to claim 9, further comprising:

(G) an organic solvent.

18. The co-modified organopolysiloxane according to claim 1, wherein the functional groups ($R^{Vi}$) are pendant functional groups.

19. The co-modified organopolysiloxane according to claim 18, wherein the functional groups ($R^A$) are pendant functional groups.

* * * * *